No. 11,870

Reissued Nov. 13, 1900.

K. PARK.

STEAM GENERATOR.

(Application filed Oct. 4, 1900.)

3 Sheets—Sheet 1.

WITNESSES:
A. D. Harrison
C. W. Seggette

INVENTOR:
Kennedy Park
by Wright Brown & Quinby
Attys

No. 11,870.

Reissued Nov. 13, 1900.

K. PARK.

STEAM GENERATOR.

(Application filed Oct. 4, 1900.)

3 Sheets—Sheet 2.

WITNESSES:

A. S. Harrison

A. W. Pezzetti

INVENTOR:

Kennedy Park by Wright Brown & Quinby attys

No. 11,870. Reissued Nov. 13, 1900.

K. PARK.

STEAM GENERATOR.

(Application filed Oct. 4, 1900.)

3 Sheets—Sheet 3.

WITNESSES:
A. D. Harrison
P. H. Pezzetti

INVENTOR:
Kennedy Park
by Wright Brown & Quinby
attys.

UNITED STATES PATENT OFFICE.

KENNEDY PARK, OF CAMBRIDGE, MASSACHUSETTS.

STEAM-GENERATOR.

SPECIFICATION forming part of Reissued Letters Patent No. 11,870, dated November 13, 1900.

Original No. 627,521, dated June 27, 1899. Application for reissue filed October 4, 1900. Serial No. 32,008.

*To all whom it may concern:*

Be it known that I, KENNEDY PARK, of Cambridge, in the county of Middlesex and State of Massachusetts, have invented certain new and useful Improvements in Steam-Generators, of which the following is a specification.

This invention relates to steam boilers and generators of tubular construction a plurality of tubes being arranged over the fire-box and connected at their ends with headers which communicate with the steam and water drums.

The invention has for its object to provide a steam-generator of this type which shall be of compact construction, the tubes being of such length as to enable the apparatus to be conveniently used on steam-yachts and other relatively small navigable vessels, the generator being at the same time constructed so as to utilize as fully as possible the efficiency of the fire.

The invention consists in the improvements which I will now proceed to describe and claim.

Figure 1:
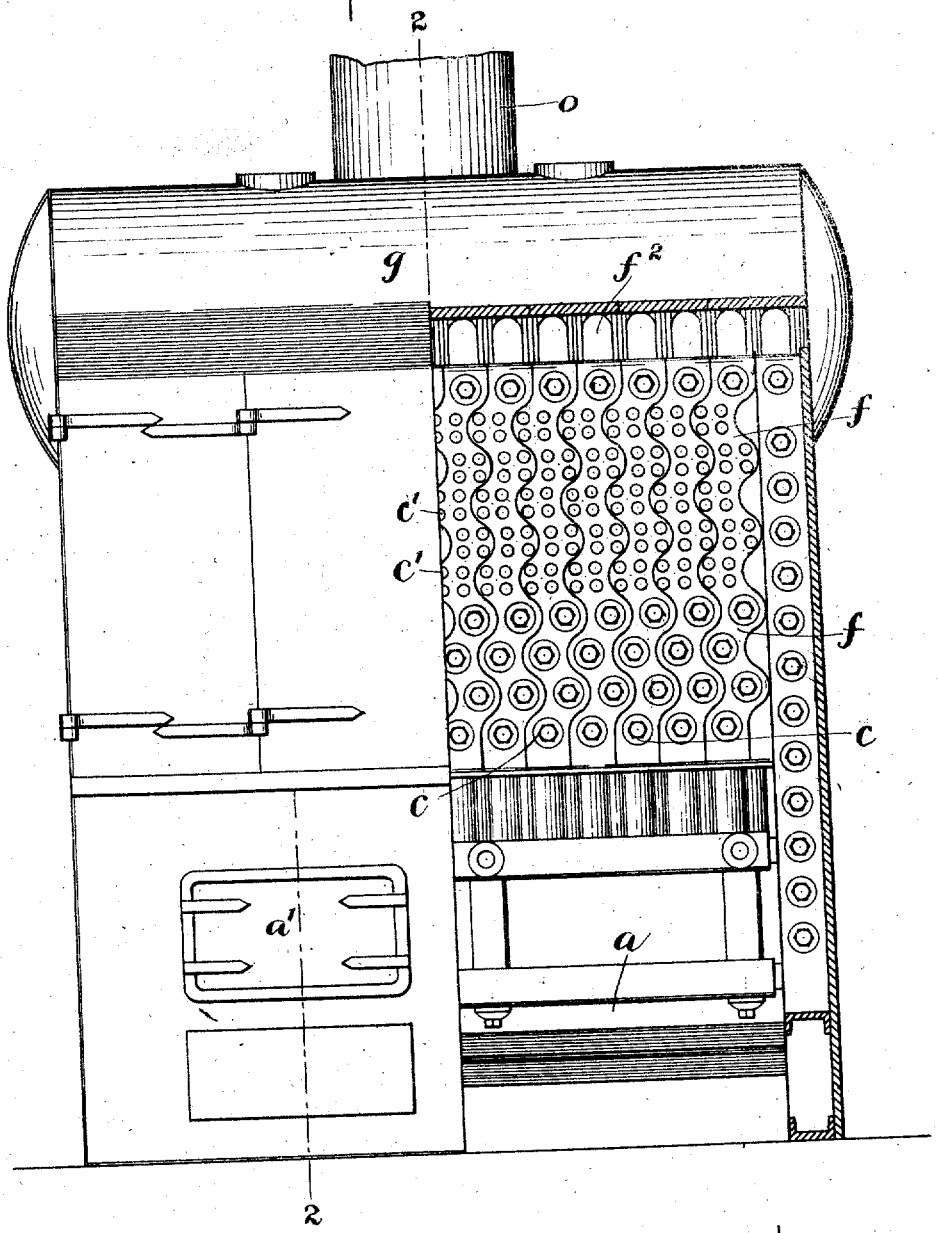
Figure 2:
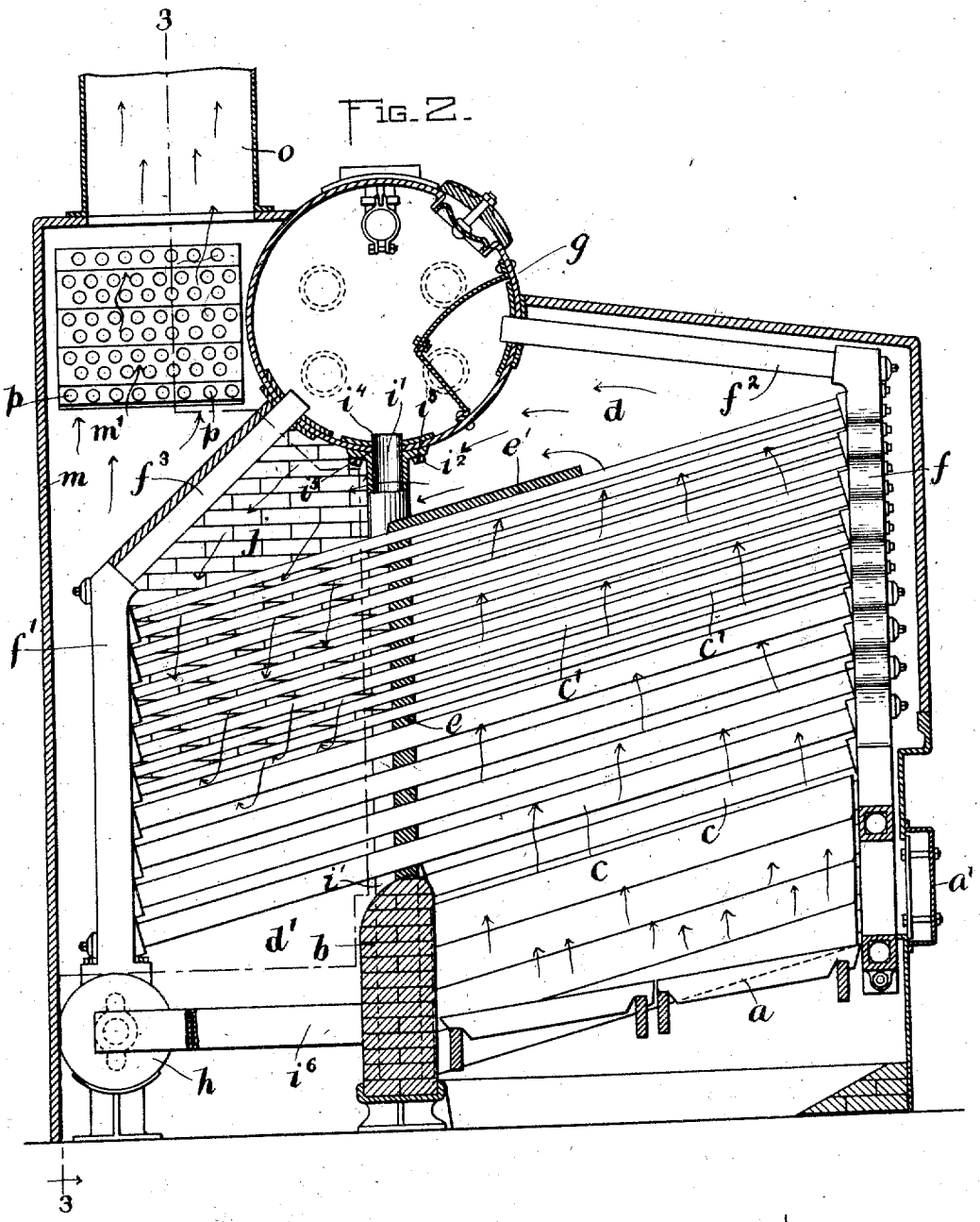
Figure 3:
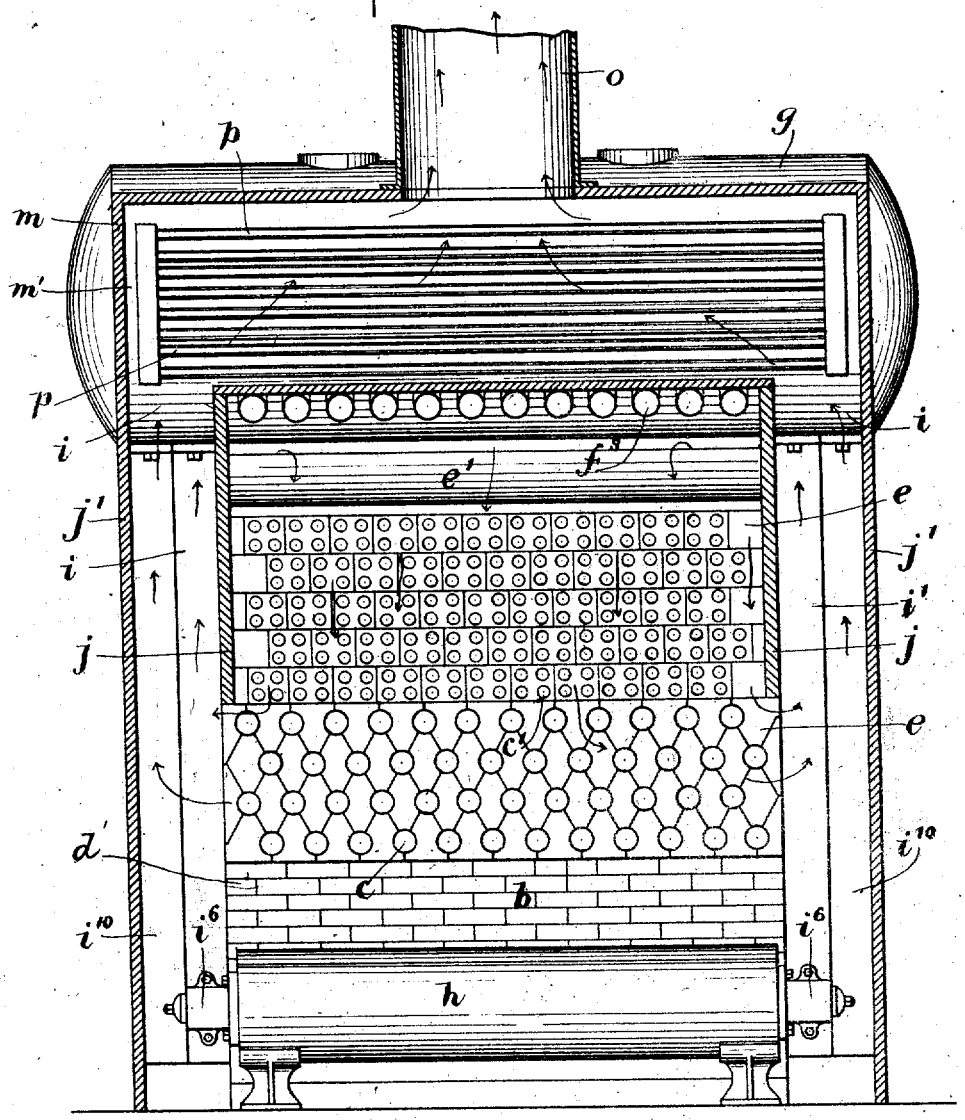

Of the accompanying drawings, forming a part of this specification, Figure 1 represents a front elevation of a steam-generator embodying my invention, a part of the casing being removed. Fig. 2 represents a section on line 2 2 of Fig. 1. Fig. 3 represents a section on line 3 3 of Fig. 2.

The same letters of reference indicate the same parts in all the figures.

I have shown my invention embodied in a steam-generator having two fire-boxes, each having a grate $a$ and fire-doors $a'$.

$b$ represents the bridge-wall, which forms the rear end of each fire-box.

$c$ $c$ $c'$ $c'$ represent inclined tubes located above the fire-boxes, the forward portions of said tubes being separated by spaces, through which the products of combustion from the fire-boxes pass upwardly to the chamber or space $d$ above said tubes. A vertical wall or baffle-plate $e$ extends from the top of the bridge-wall across the series of tubes and to the space or chamber $d$, where said wall terminates, the wall $e$ forming a barrier between the space over the fire-boxes surrounding the front portions of the tubes $c$ and a corresponding, although preferably shorter, space surrounding the rear portions of the tubes and extending from the rear portion of the chamber $d$ downwardly to a space or chamber $d'$ below the rear portions of the tubes and behind the bridge-wall $b$. The front and rear ends of the tubes $c$ $c'$ are inserted in front headers $f$ and rear headers $f'$, the headers $f$ collectively forming a front wall and the headers $f'$ a rear wall. The upper ends of the headers $f$ are connected by tubes $f^2$ with the steam-drum $g$, while the upper ends of the headers $f'$ are connected by tubes $f^3$ with said steam-drum, the tubes $f^2$ entering the drum $g$ at a higher level than the tubes $f^3$, so that the steam and hot water, which are caused by the inclination of the tubes $c$ $c'$ to flow upwardly into the headers $f$, pass from thence into the steam-drum at or above the water-level of the latter, while the water from the lower portion of the steam-drum flows downwardly through the tubes $f^3$ into the headers $f'$ and into the lower ends of the tubes $c$ $c'$.

$h$ represents a water-drum located below and connected with the lower ends of the headers $f'$, said drum being connected by horizontal tubes $i^6$ and vertical tubes $i'$ with the lower portion of the steam-drum $g$.

The products of combustion from the fire-boxes pass upwardly between the forward portion of the tubes $c$ $c'$ into the space or chamber $d$, an inclined baffle-plate $e'$ forming an extension of the wall $e$, causing the products to pass into the forward portion of said chamber $d$, as indicated by arrows in Fig. 2. The products of combustion pass through the chamber $d$, over the baffle-plate $e'$, across the upper end of the wall $e$, and then pass downwardly between the rear portions of the tubes $c'$ and $c$ to the chamber $d'$. The end portions of the space or chamber $d'$ communicate with vertical flues or uptakes $i$ $i$, Fig. 3, which are formed by vertical walls or partitions $j$ $j$, located between the rear portions of the tubes $c$ $c'$ and the end portions $j'$ of the external casing. The said flues $i$ extend from the chamber $d'$ to the ends of a supplemental chamber $m'$, formed by a casing $m$, located above the series of tubes at the rear side of the steam-drum, as shown in Fig. 2. The escape flue or stack $o$ extends from the upper portion of the chamber $m'$, and in said chamber is located a feed-water heater composed of a connected series of tubes $p$, having suitable connections at one end with a source of water-supply and at the other end with the steam-drum $g$. To afford space for the vertical flues $i$ $i$, two headers $f'$ are omitted from the ends of the series of rear headers, and the tubes $c$ $c'$ that would have entered the omitted headers $f'$ are connected with vertical tubes $i^{10}$, which are located beside the tubes $i'$ and take the place of the omitted headers $f'$. The series of tubes $c'$ therefore has a wider forward portion in front of the bridge-wall and a narrower rear portion behind the bridge-wall, said narrower portion providing for the flue-spaces $i$ beside the rear portion of the series of tubes, so that said flue-spaces do not involve any elongation of the casing.

It will be seen that the described construction causes the products of combustion after passing upwardly between the forward portions of the tubes $c$ $c'$ to pass downwardly between the rear portions of said tubes and then pass through the feed-water heater before escaping, the entire arrangement being such that economy of space and an economical use of the fuel are obtained. This generator is well adapted for use on sea-going vessels of small size, such as steam-yachts, owing to its compact form.

It is obvious that the arrangement may be such that the products of combustion will pass downwardly through the flues $i$ $i$ from the chamber $d$ to the chamber $d'$ and then upwardly between the rear portions of the tubes $c$ $c'$ to the chamber $m'$ and through the feed-water heater. I do not consider the last-mentioned arrangement, however, so desirable as that first described, it being obviously more advantageous to pass the products of combustion directly from the chamber $d$ downwardly between the rear portions of the tubes $c$ and $c'$ and then upwardly to the feed-water heater.

The vertical tubes $i^{10}$, which take the places of the omitted headers $f'$, serve also to support the steam-drum, and as the tubes $i'$ extend from the lowest portion of the steam-drum and are connected by the tubes $i^{9}$ with the water-drum a flow of water from the steam-drum to the water-drum is insured so long as any water remains in the steam-drum.

The tubes $i'$ are connected with the steam-drum by means of flanges $i^{2}$, formed on the tubes $i'$ and bolts $i^{3}$, passing through said flanges into the steam-drum. To insure a tight joint, a sleeve or nipple $i^{4}$ is expanded in the orifice formed in the steam-drum to connect it with the tube $i'$, said orifice being smaller than the interior of said tube. The sleeve $i^{4}$ extends into the tube $i'$ and is expanded against the inner surface of the latter, the tube being preferably provided with an internally-projecting annular seat $i^{5}$, against which the outer portion of the sleeve $i^{4}$ is expanded. This connection may be applied to other parts of the apparatus—for example, where the headers $f'$ join the water-drum $h$.

The wall or partition $e$ may be formed by inserting suitably-shaped sections of fire-brick between the tubes $c$ $c$ $c'$ $c'$, or said wall may be hollow and formed as a water-leg, its interior communicating with the said tubes, in which case the wall may be composed of a series of headers, like the headers $f$ or $f'$, and the tubes instead of extending continuously across the bridge-wall would each be made in two parts or sections expanded into the headers forming the wall $e$. The walls or partitions $j$ $j$ may also be made by inserting sections of fire-brick between the outer vertical rows of tubes at the rear of the wall $e$.

I claim—

1. A boiler or steam-generator comprising a fire-box, a series of tubes extending lengthwise of the fire-box, a partition located above the bridge-wall and extending crosswise of the tubes, some of the tubes being relatively long and extending rearwardly from the said partition, while other tubes are relatively short and terminate at or near said partition, whereby flue-spaces are formed at the rear of the partition within the length of the longer tubes, said partition causing the products of combustion rising from the fire-box to pass between the tubes at the front of the partition, an elevated space or chamber above the tubes to receive the products of combustion, an escape flue or stack, a lower space or chamber below the tubes at the rear of the partition, and flues or passages located in said spaces, said lower chamber and flues constituting connections between the elevated chamber and the stack, whereby the products of combustion received by the elevated chamber are conducted first downwardly and then upwardly, the said products being presented to the tubes at the rear of the partition in their passage from the elevated chamber to the stack.

2. A boiler or steam-generator comprising a fire-box, a series of tubes extending lengthwise of the fire-box, a partition extending across the series of tubes between their forward and rear portions, the said series being narrower at the rear than at the front of the partition, said partition causing the products of combustion rising directly from the fire-box to pass between the wider forward portion of the series of tubes, an elevated space or chamber above the tubes to receive the products of combustion, an escape flue or stack, a lower space or chamber below the narrower rear portion of the series of tubes, and side flues or passages located beside the narrower portion of the series of tubes and beside the lower chamber, said lower chamber and side flues constituting connections between the elevated chamber and the stack, whereby the products of combustion received by the elevated chamber are conducted first downwardly and then upwardly, the said products being presented to the rear portions of the tubes in their passage from the elevated chamber to the stack.

3. A boiler or steam-generator comprising a fire-box, a series of tubes extending lengthwise over the fire-box and across the bridge-wall of the fire-box, a partition extending across the series of tubes between their forward and rear portions and extending partly over the forward portions of the tubes, said partition causing the products of combustion rising directly from the fire-box to pass between the forward portions of the tubes including their forward ends, an elevated space or chamber above the tubes to receive the products of combustion from between the forward portions of the tubes, a lower space or chamber below the rear portions of the tubes, an escape flue or stack, and connections between the stack, the lower chamber, and the elevated chamber, whereby the products of combustion received by the elevated chamber are conducted first downwardly and then upwardly, the said products being presented to the rear portions of the tubes in their passage from the elevated chamber to the stack.

4. A boiler or steam-generator comprising a fire-box, a series of tubes extending lengthwise over the fire-box and across the bridge-wall of the fire-box, a partition extending across the series of tubes between their forward and rear portions and extending partly over the forward portions of the tubes, said partition causing the products of combustion rising directly from the fire-box to pass between the forward portions of the tubes including their forward ends, an elevated space or chamber above the tubes to receive the products of combustion from between the forward portions of the tubes, a lower space or chamber below the rear portions of the tubes, an escape flue or stack, connections between the stack, the lower chamber, and the elevated chamber, whereby the products of combustion received by the elevated chamber are conducted first downwardly and then upwardly, the said products being presented to the rear portions of the tubes in their passage from the elevated chamber to the stack, and a feed-water heater arranged to be acted on by the products of combustion rising from the rear portions of the tubes.

5. A boiler or steam-generator comprising a fire-box, a series of tubes extending lengthwise over the fire-box and across the bridge-wall of the fire-box, a partition extending across the series of tubes between their forward and rear portions, said partition causing the products of combustion rising directly from the fire-box to pass between the forward portions of the tubes, an elevated space or chamber above the tubes to receive the products of combustion from between the forward portions of the tubes, a lower space or chamber below the rear portions of the tubes, a supplemental casing or chamber above the rear portions of the tubes, an escape flue or stack connected with the supplemental chamber, flues or uptakes connecting the ends of the lower chamber with the ends of the supplemental chamber, the arrangement being such that the products of combustion pass from the elevated chamber downwardly between the rear portions of the tubes, to the lower chamber, and from thence through the uptakes, to the supplemental chamber, and a feed-water heater in the supplemental chamber.

In witness whereof I have signed my name to this specification in the presence of two subscribing witnesses.

KENNEDY PARK.

Witnesses:
C. F. BROWN,
A. D. HARRISON.